United States Patent [19]

Hofmann et al.

[11] Patent Number: 5,486,678
[45] Date of Patent: Jan. 23, 1996

[54] PROCESS OF AND MACHINERY FOR JOINING TWO METAL SHEETS BY WELDING

[75] Inventors: Jörg Hofmann, Giessen; Harald Knetsch, Herborn/Seelbach; Kurt Liebich, Lich; Reinhold Opper, Alten-Buseck; Hans Wiessler, Wettenberg; Alois Bauer, St. Wolfgang, all of Germany

[73] Assignee: Emhart Inc., Newark, Del.

[21] Appl. No.: 204,039

[22] Filed: Mar. 1, 1994

[30] Foreign Application Priority Data

Mar. 1, 1993 [DE] Germany .......................... 43 06 282.2

[51] Int. Cl.⁶ .................................................. B23K 9/007
[52] U.S. Cl. ...................... 219/127; 219/137 R; 228/165
[58] Field of Search ..................................... 219/127, 105, 219/121.63, 137 R; 228/165, 166, 170, 174

[56] References Cited

U.S. PATENT DOCUMENTS

| | | | |
|---|---|---|---|
| 1,236,145 | 8/1917 | Burns | 219/127 |
| 1,858,883 | 5/1932 | Cook et al. | 219/127 |
| 3,035,158 | 5/1962 | Copleston et al. | 219/127 |
| 3,204,083 | 8/1965 | Fromm et al. | 219/127 |
| 3,613,106 | 10/1971 | Cavagnero | 219/105 |
| 3,774,009 | 11/1973 | Hodges . | |
| 4,138,773 | 2/1979 | Moatti et al. . | |
| 4,163,869 | 8/1979 | Almand, III et al. | 174/94 R |
| 4,741,471 | 5/1988 | Sullivan | 228/166 |
| 5,006,694 | 4/1991 | Handke et al. | 219/121.63 |
| 5,277,353 | 1/1994 | Budig et al. . | |

FOREIGN PATENT DOCUMENTS

| | | |
|---|---|---|
| 0247930 | 12/1987 | European Pat. Off. . |
| 2457741 | 12/1980 | France . |
| 1565563 | 11/1966 | Germany . |
| 1811820 | 6/1970 | Germany . |
| 2125748 | 12/1971 | Germany . |
| 1440380 | 3/1972 | Germany . |
| 2238822 | 2/1974 | Germany . |
| 7229237 | 5/1974 | Germany . |
| 2739867 | 3/1978 | Germany . |
| 2755694 | 6/1978 | Germany . |
| 3149513 | 6/1983 | Germany . |
| 3210310 | 9/1983 | Germany . |
| 273590 | 7/1988 | Germany . |
| 4113633 | 10/1992 | Germany . |
| 4120811 | 1/1993 | Germany . |
| 4125748 | 2/1993 | Germany . |
| 1575119 | 9/1980 | United Kingdom . |

OTHER PUBLICATIONS

JP 63–174837(A). In: Patents Abstracts of Japan, M–766, Nov. 21, 1988, vol. 12, No. 442.
JP 62–079930 In: Patent Abstracts of Japan, M–623, Sep. 9, 1987, vol. 11, No. 278.
T. Lyman, editor, Metals Handbook, vol. 6, Welding and Brazing, 1971, pp. 318–319.

*Primary Examiner*—Clifford C. Shaw
*Attorney, Agent, or Firm*—E. D. Murphy

[57] ABSTRACT

Process for welding a weld-in part in a weld point comprising a metal plate and a metal covering lying thereon with two tools of which one is formed by a welding head and the other by a drill for preparing the weld point by a drilling process. The drill attached to a revolving device initially in one operating position, by means of a lifting motor which can be moved in a controlled manner between a return position and a machining end-position and vice versa, performs the process at least until the metal plate is drilled (machining end-position) in preparation of the weld point. By pivoting of the revolving device, a welding head arranged on the revolving device and equipped with the weld-in part is then brought into an operating position above the prepared weld point to perform welding, meanwhile the drill is coupled to the lifting motor when the welding head is coupled to the lifting motor when the drill is uncoupled to perform welding on completion of the drilling process. Drill and the welding head are each set aside in their return position on a rest shoulder after pivoting of the revolving device, the welding head being equipped with a weld-in part in the rest position and the revolving device pivoting the drill or the welding head into the respective operating position from the rest position.

28 Claims, 10 Drawing Sheets

PROCESS OF AND MACHINERY FOR JOINING TWO METAL SHEETS BY WELDING

FIELD OF THE INVENTION

The invention relates to a process of joining two overlapping metal sheets by welding, and more particularly to such a process including the step of introducing a weld-in part, or plug, into an aperture formed in one of the sheets. The invention also relates to a machine for implementing this process in which two tools are arranged on a revolving device which is rotatable round a revolving device shaft and displaceable by a common lifting motor in the direction of the revolving device shaft, one tool consisting of a drill. Both the process and the machine are particularly adaptable to aluminum sheets.

BACKGROUND OF THE INVENTION

In the field of automobile manufacture, substantial efforts are now underway to convert from the use of steel in automotive bodies to aluminum. While welding is a strongly preferred process for joining separately formed sheets to create a unitary automotive body, the well-known difficulties of welding aluminum have heretofore presented serious obstacles to the successful manufacture of aluminum car bodies.

More particularly, in attempting to weld bodies of aluminum, major difficulties have been caused by the fact that aluminum exposed to air immediately begins to form an oxide layer on its surface. Furthermore, the thickness of the layer may vary greatly depending on the time and conditions of such exposure. Thus, in addition to the welding problems caused by the presence of a layer of aluminum oxide, the difficulties have been very substantially increased by the fact that the thickness of the oxide layer may vary greatly from one part to another or even from one area of one part to another area of the same part. These problems make it very difficult to reliably weld even one single point. It has previously been nearly impossible to automate a repetitive process for successive weld points.

OBJECTS AND ADVANTAGES

It is accordingly an object of this invention to provide an improved process for reliably joining metal sheets.

It is a further object of this invention to provide an improved method of welding metal sheets together while overcoming the difficulties caused by the formation of an undesirable coating on the surface of the metal.

It is a further object of this invention to provide a repetitive process of producing reliable weld joints between two metal members which are subject to rapid oxidation wherein the weld conditions are controlled so as to avoid the problems caused by the oxide layer.

It is a further object of this invention to provide machinery for implementing the welding process of this invention wherein the structure of the machinery contributes to the control of the weld conditions.

A particular the object of this invention is to automate the process for welding a weld-in part or plug at in a weld point to join a metal plate and a metal covering lying thereon. The welding of a weld-in part forming the basis of the invention is disclosed in U.S. Pat. No. 3,950,631. In order to weld the weld-in part, the metal covering is initially drilled through and the weld-in part then welded to the metal plate and the metal covering in a known manner by an arc welding process. It has been found that this method of joining two metal plates using a weld-in part is particularly advantageous for the welding of aluminum sheets.

The object forming the basis of the invention, of automating the drilling and welding process, is achieved in that firstly the drill attached to a revolving device in one operating position performs the drilling process by means of a lifting motor, which is movable in a controlled manner between a return position and a machining end-position and vice versa, at least until the metal plate is drilled (machining end-position) and, thereafter, a welding head arranged on the revolving device and equipped with the weld-in part is brought, by pivoting of the revolving device, into an operating position above the prepared weld point to perform welding, meanwhile the drill is coupled to the lifting motor when the welding head is uncoupled during the drilling process and, on completion of the drilling process, the welding head is coupled to the lifting motor when the drill is uncoupled to perform welding, the drill and the welding head each being set aside in their return position after pivoting of the revolving device, on a rest shoulder in a rest position in which the welding head is equipped with a weld-in part and from which the revolving device pivots the drill or the welding head into the respective operating position.

With this process, the drilling and welding procedures are carried out in succession so the respective tool, namely the drill or the welding head, is coupled alone to the lifting motor in each case so that, during the drilling process when the welding head is uncoupled, the welding head may be equipped with a new weld-in part in a defined rest position and is therefore immediately available for the welding process in completion of the drilling process. The rest position of the welding head in which the welding head is held during the drilling process is particularly advantageous for equipping the welding head as this equipping process is not disturbed by a reciprocating movement of the welding head. Furthermore, the coupling and uncoupling of drill and welding head on the lifting motor is achieved in that the respective movement is not affected by the mass inertia of the other respective tool, and this is significant insofar as movements having defined speeds of advance, stroke lengths and final values are required on the one hand for the welding of the weld-in part for desirable control of arc welding and on the other hand for drilling for the purpose of desirable cutting.

It is obviously possible to arrange one or more sheet metal parts between the metal plate and the metal covering, these sheet metal parts then being welded together with the weld-in part.

A prior art device for carrying out a somewhat similar process is formed by U.S. Pat. No. 4,138,773, in which two tools are arranged on a revolving device which is rotatable round a revolving device shaft and displaceable by a common lifting motor in the direction of the revolving device shaft, one tool consisting of a drill and the other of a screwdriver for assembly furniture. In the device according to this invention, however, the other tool is formed by a welding head and each tool is mounted in a singly longitudinally displaceable manner individually on axial guides rigidly connected to the revolving device, the revolving device shaft being fastened on a frame carrying the lifting motor and, as a hollow shaft, surrounding a coaxial clutch shaft which is axially displaceable by the lifting motor and on which the two tools may be coupled and uncoupled singly and independently of one another.

This design of the device basically differs from the '773 device according as, with the device according to the invention, each tool is mounted individually on the revolving device in a singly longitudinally displaceable manner whereas with the known device the relative movement between two tools and the workpiece takes place simultaneously, more specifically as mentioned above, by the raising and lowering of the table carrying the workpiece so that the mass inertia influencing this relative movement is defined by the sum of the weights of table and workpiece.

The drill advantageously rests in a drill drive which is arranged as a unit with the drill in a longitudinally displaceable manner in the revolving device. The drive for the drill therefore remains concentrated individually on the drill.

To pivot the revolving device, the revolving device is preferably connected to a toothed quadrant which is arranged coaxially to the clutch shaft and in which a toothed rack driven by a displacement mechanism engages for performance of the pivoting movement of the revolving device. The toothed rack is particularly suitable for being connected to the piston of a pneumatically actuated piston/cylinder unit, affording the additional advantage that the end position of a toothed rack may easily be damped.

In order to automate the equipping of the welding head in its rest position with a weld-in part, the welding head may advantageously be opposed in its rest position by a pair of tongs, which is pivotal in the manner of a rocker, for receiving the weld-in part, wherein the weld-in parts may be supplied singly in succession to the pair of tongs, a respective weld-in part being inserted into a receiver in the welding head by pivoting of the tongs. The operating cycle of equipping may then readily be incorporated into the operating cycle of the entire device.

For the processing of weld-in parts with a hole it is preferable to use a receiver for the weld-in parts having an expanding pin which grasps and clamps the respective weld-in part in its hole. This method of receiving a weld-in part by means of an expanding pin is particularly simple as it is not necessary to use external jaws which are complicated to actuate. A further advantage is that particularly good contact and therefore current transfer from the receiver to the weld-in part is achieved owing to the expansion.

In order to secure the components to be welded, it is preferable to arrange on the frame a clamping device with which the components are gripped. This clamping device may be designed such that it consists of a foot which is arranged on the frame and brings about the gripping of the components against an abutment of the clamping device when the device is started up. To prevent cuttings from contaminating, in particular, the subsequent weld point during the drilling process, the drill drive is preferably connected to a suction arrangement which surrounds the drill and may also be displaceably arranged so that it can be adapted to the respective position of the drill drive.

The use of protective gas is advantageous or necessary for the welding of certain materials. To allow this, a separately lowerable sleeve surrounding the weld point is arranged on the welding head to supply protective gas. As the sleeve is displaceable, the sleeve does not obstruct the equipping of the welding head.

To enable the entire drilling stroke to be adjusted individually during each drill process, it is possible to insert an ammeter in a circuit for the drill drive, the ammeter emitting a signal of which the appearance determines the relative position of the clutch shaft during an increase in the loading of the drill drive (drill striking the surface of the metal covering). On the basis of the relative position detected, the depth of drilling (machining end-position) may then be adjusted in a defined manner by appropriate control of the lifting motor. It is therefore also possible to define an approach position of the weld-in part onto the metal plate from the relative position. From this approach position, the weld-in part may then be brought with a relatively slow advance into contact with the metal plate whereupon the arc is ignited and welding takes place.

A particular advantage derived from the process and machinery of the present invention lies in the discovery that the aluminum oxide layer on the surface of an aluminum part need not obstruct the reliability of the weld if it is a small and predictable thickness. In these conditions, the voltage, current, gap and duration of the welding discharge can be controlled to a given set of parameters, for example those which might be satisfactory to deal with an oxide layer of less than one micron. As long as each successive set of aluminum parts presented to the weld head for welding has an oxide layer of less than one micron, the same weld conditions will repeatedly produce satisfactory welds.

Accordingly, the process of the present invention includes the repetitious cyclical steps of drilling, cutting or otherwise removing previously formed oxide layers from the surfaces of the aluminum parts to be joined so as to expose fresh aluminum and then presenting the weld-in part or plug to the weld point and initiating the arc discharge at a constant time interval following the end of the drilling process. In accordance with this technique, if the time interval is, for example, 0.1 second, then the weld parameters including voltage, current, gap and duration are set to the values which will produce a reliable weld after the exposure of fresh aluminum to oxygen for that time interval. Thereafter, every successive weld will occur in aluminum which has been exposed for the same time interval and each successive weld will therefore also be satisfactory.

Another aspect of this invention is the provision of a single machine incorporating both a drilling head and a welding head so that the time interval between drilling and welding will always be subject to the same machine cycle time, the exposure to oxygen will be constant, and the initially determined welding parameters will repetitively produce satisfactory welds.

BRIEF DESCRIPTION OF THE DRAWINGS

In order that the invention may be better understood preferred embodiments will now be described in greater detail by way of example with reference to the accompanying drawings in which:

FIG. 4b shows a development of the revolving device according to FIG. 4a;

FIG. 5a shows a section along line V—V in FIG. 4a;

DETAILED DESCRIPTION OF THE DRAWINGS AND PREFERRED EMBODIMENTS

Figure 1:
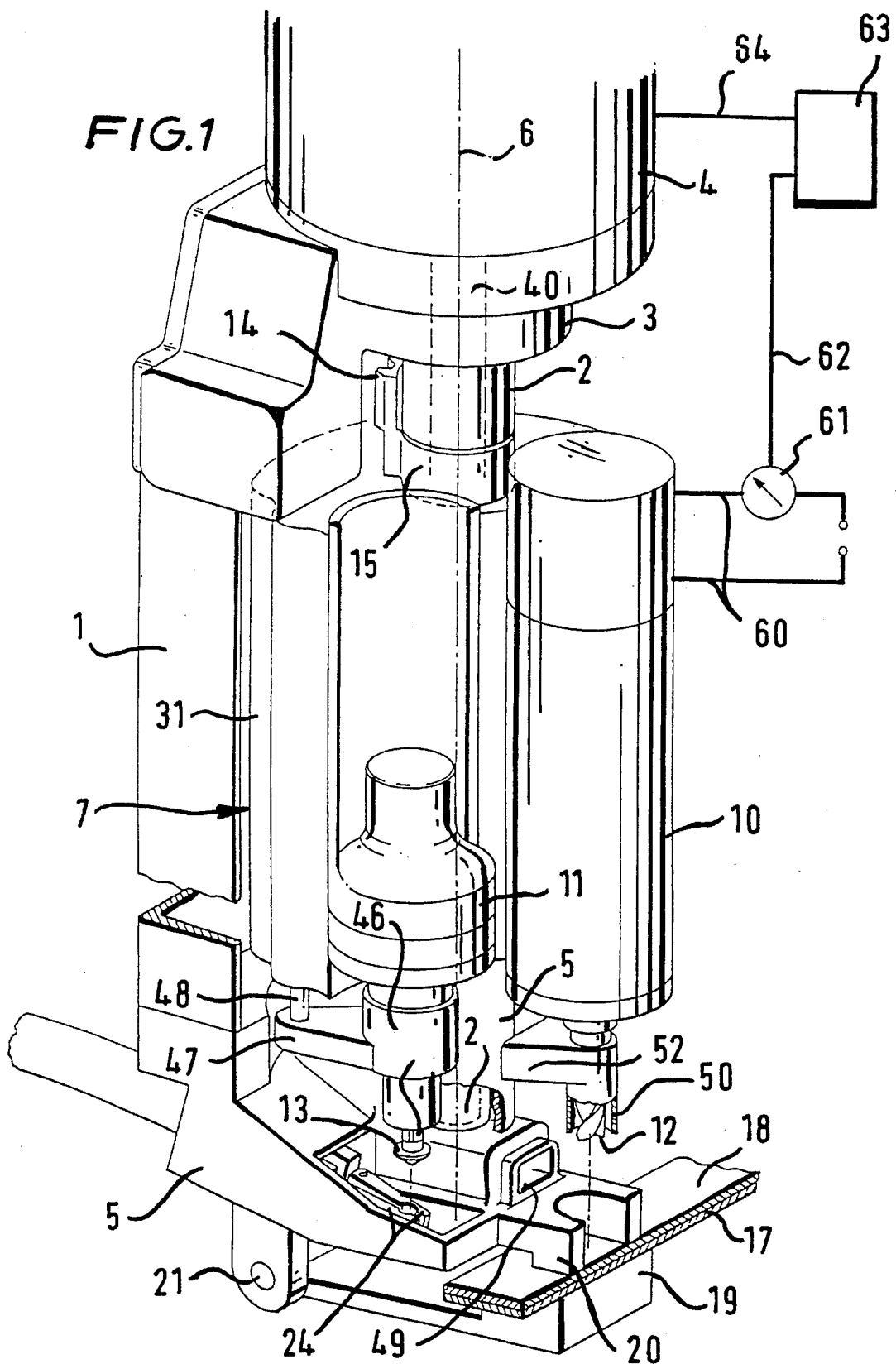
FIG. 1 is a perspective overall view of the device prior to commencement of the drilling process.

FIG. 1 shows the entire device in a perspective view with the frame (1) which is located in the rear region of the device and carries the entire device (see also sectional view in FIG. 5). The revolving device shaft (2) is fastened on the frame (1), for which purpose the frame (1) is provided with the cross member (3) in its upper region. The revolving device shaft (2) may be screwed, for example, in the cross member (3). The lifting motor (4), operation of which will be described in detail hereinafter, is mounted on the cross member (3). The revolving device shaft (2) extends from top to bottom through the entire device and ends in the frame foot (5) extending transversely over the device in the lower region. The frame foot (5) is broken away in the region of the centre line (G) of the revolving device shaft shown in dot dash lines to reveal the lower end of the revolving device shaft (2) which is connected in any way, for example by screwing, to the frame foot (5). As shown, the revolving device shaft (2) is illustrated as a hollow shaft which will be described in detail hereinafter.

Figure 2:
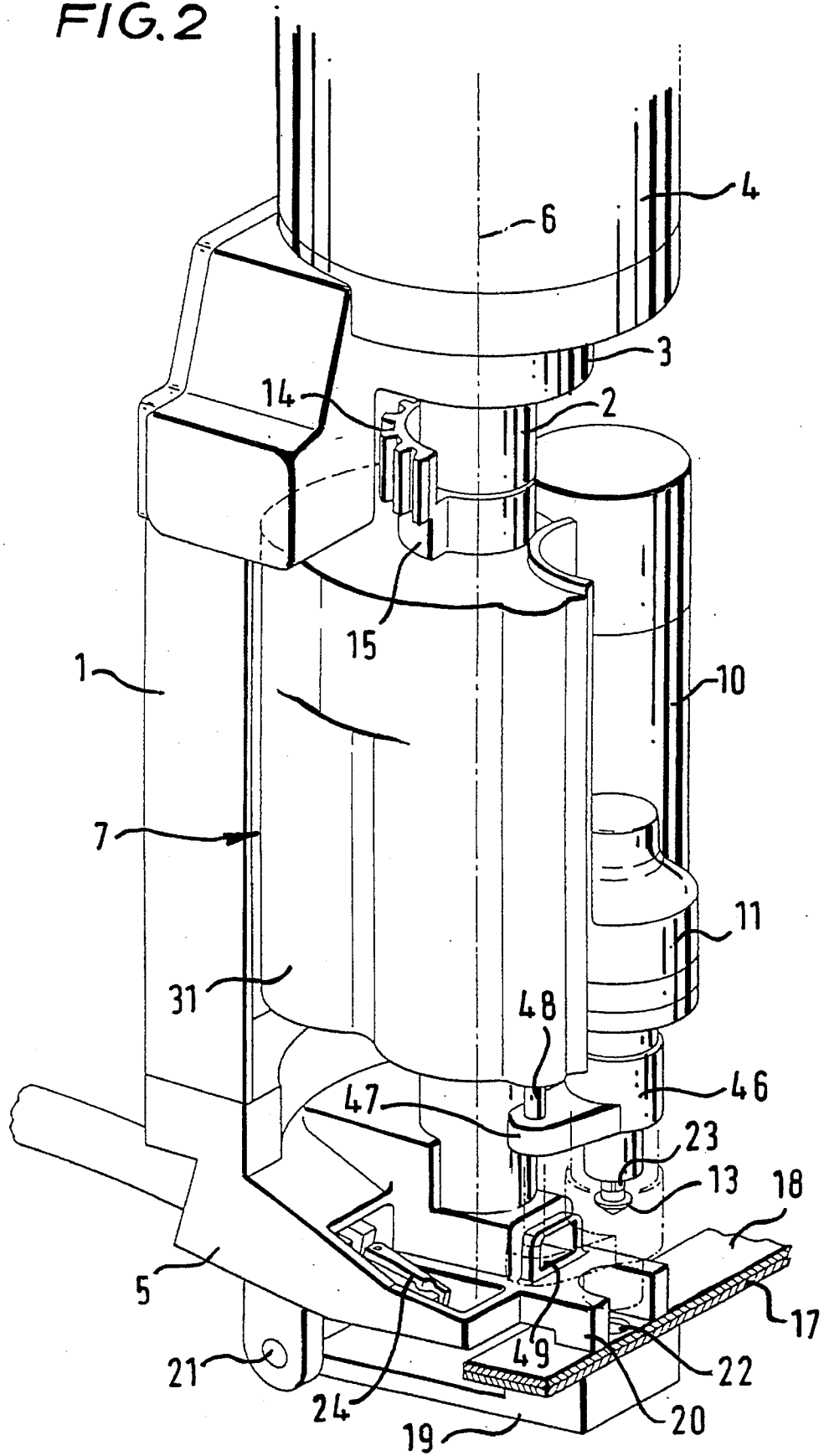
FIG. 2 shows the same device with the revolving device pivoted from the illustration in FIG. 1, before commencement of the welding process.

The revolving device (7) is pivotally mounted on the revolving device shaft (2). The revolving device (7) is secured against axial displacement by the ball bearing (8) shown in FIG. 4b, for which purpose the ball bearing (8) rests rigidly on the lower end (9) of the revolving device shaft (2) and rests outwardly against the frame foot (5). The revolving device (7) carries the drill drive (10) and the welding head (11). The drill drive (10) with its drill (12) as well as the welding head (11) with a weld-in part (13) grasped by it may be pivoted into a working position by pivoting of the revolving device (7). FIG. 1 shows the drill (12) in the operating position (FIG. 2 shows the device with the weld-in part (13) in the operating position).

Figure 4A:
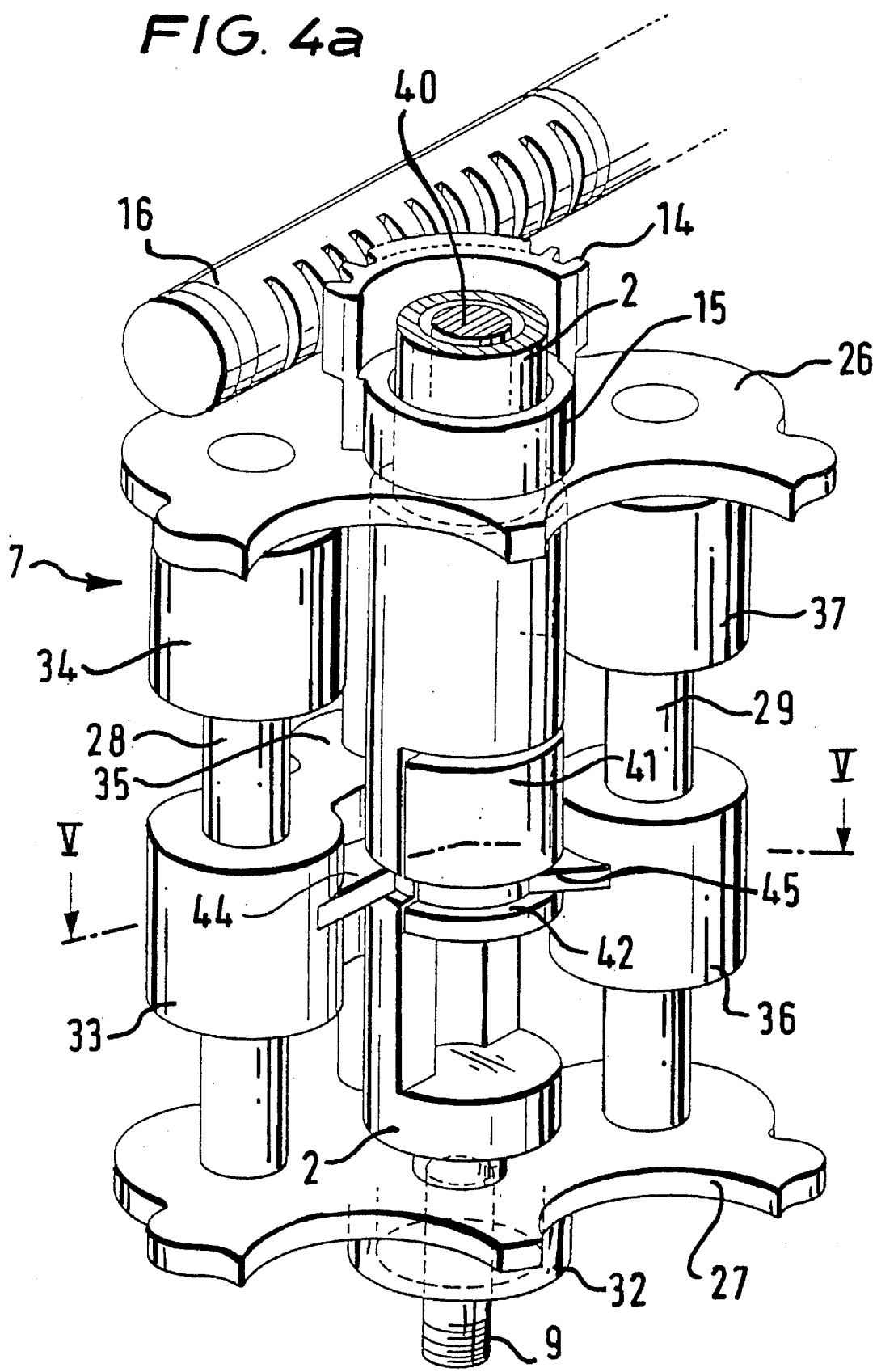
FIG. 4a is a perspective view of the revolving device.

The revolving device (7) pivoted by means of a toothed quadrant (14) which is arranged on its upper side, is rigidly connected to it and grows from a hub (15) of the revolving device (7). The hub (15) serves to mount the revolving device (7) on the revolving device shaft (2). The toothed rack (16) which is designed as a piston of a piston/cylinder unit and is illustrated in FIG. 4a engages in the toothed quadrant (14). The associated cylinder is arranged in the cross member (3) (not shown in detail). The revolving device (7) is pivoted into its two pivot positions in the manner described hereinbefore by axial displacement of the toothed rack (16).

A metal plate (17), to be provided with the weld-in part (13), with a metal covering (18) lying thereon is shown in FIG. 1. These two metal parts (17, 18) designed as sheet metal plates are pressed by the clamping shoe (19) against the frame foot (5) which is provided with the U-shaped projection (20) for this purpose. The clamping shoe (19) is pivotally mounted by means of the shaft (21) on the frame foot (5) and is pressed by a mechanism not shown here against the plates (17,18) so that the plates 17,18 are rigidly fixed between the clamping shoe (19) and the projection (20).

In a first machining phase, the drill drive (10) with the drill (12) is lowered in the operating position shown in FIG. 1 for which purpose the drill drive (10) is axially displaced by means of the lifting motor (4) in a manner described in detail hereinafter. The rotating drill (12) strikes the metal covering (18) in the region surrounded by the two arms of the projection (20) and drills through the metal covering (18) at least until the metal plate (17) is drilled so that the drill (12) adopts its machining end-position. The metal covering (18) as well as the metal plate (17) are therefore prepared for the following welding process as any oxide layers have been removed from the metal parts (17, 18) by the drilling process (see recess (22) in FIG. 2). The drill drive (10) with the drill (12) is then displaced axially into the return position shown in FIG. 1, whereupon the revolving device (7) is pivoted by actuation of the toothed rack (16) by means of the toothed quadrant (14) until the welding head (11) is located in the operating position.

FIG. 2 shows the device with the welding head (11) in the operating position, the welding head (11) with the weld-in part (13) grasped by it is located axially above the recess (22) previously drilled by the drill (12). For this purpose, the weld-in part (13) is held by a receiver which is described in conjunction with FIG. 7 and is designed as a collet chuck (23). The welding head (11) is now lowered by means of the lifting motor (4) (see below), so the weld-in part (13) travels into the recess (22). This procedure, including welding, is described in detail in the above-mentioned DE-OS 21 25 748, so reference may be made to this document with regard to the weld-in procedure. The welding head (11) is lowered axially until the weld-in part (13) comes into contact with the metal plate (17), whereupon an arc is ignited, the arc being caused to continue firing by brief raising of the weld-in part (13) until the welding head (11) with the weld-in part (13) is immersed into the melt thus produced by an appropriate changeover of the lifting motor (4). The collet chuck (23) holding the weld-in part (13) is now released so that the welding head (11) may be displaced axially upwardly into its return position shown in FIG. 2. The metal plate (17) and the metal covering (18) may be displaced laterally for further welding. If the arrangement of metal plate (17) and metal covering (18) is otherwise secured rigidly, for example parts of a car body held on an assembly line, the device is accordingly displaced along the two plates (17, 18). The revolving device (7) is pivoted back for the next welding process, more specifically by reverse actuation of the toothed rack (16) whereupon the device returns to the starting position shown in FIG. 1.

Figure 3:
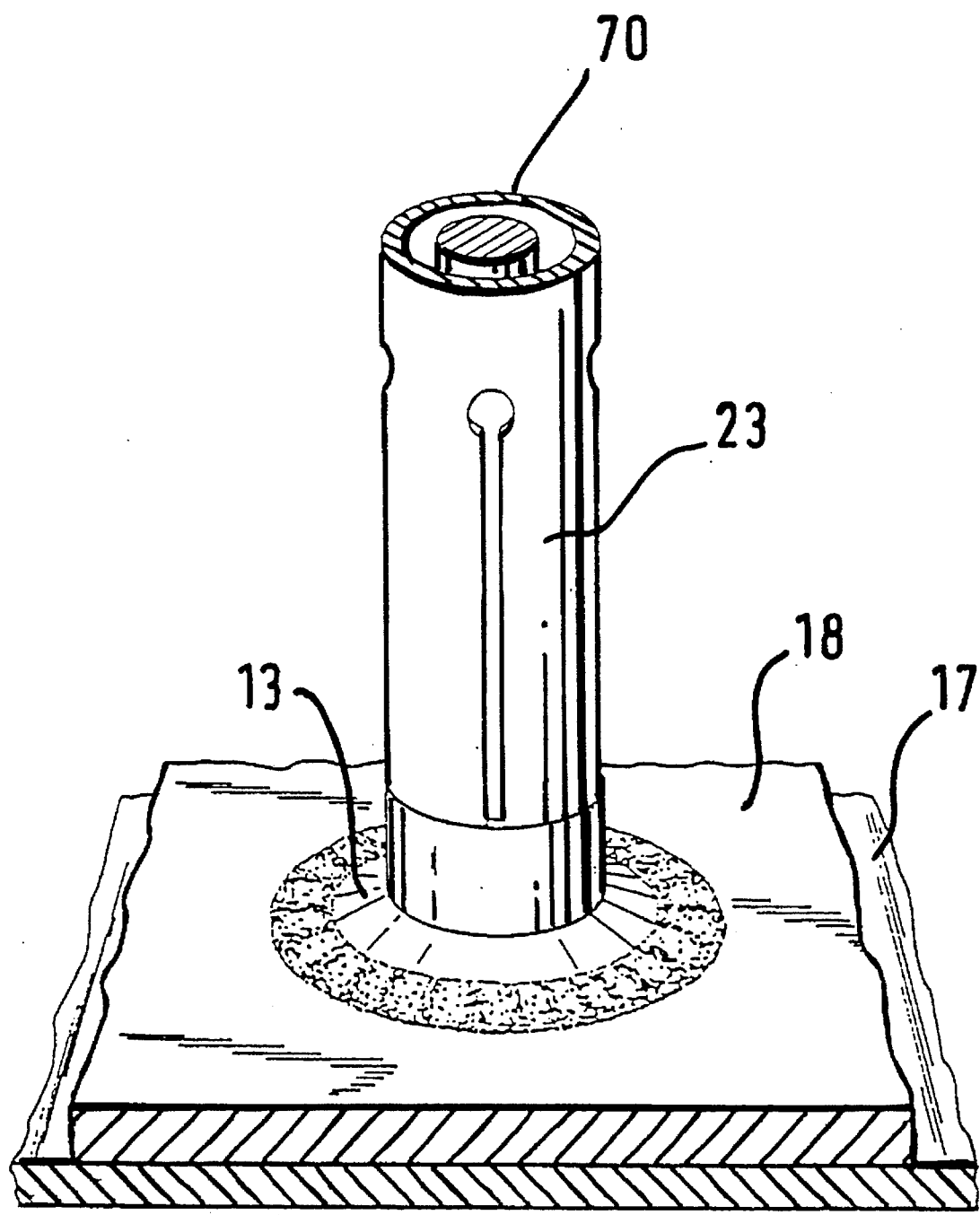
FIG. 3 shows a welded-in weld-in part with the welding head receiver holding the weld-in part.

FIG. 3 shows the weld-in part (13) which is welded into the metal covering (18) and forms the welded joint to the metal plate (17). The welding head receiver is formed by the collet chuck (23) which is opened and closed by the expanding pin (70).

Figure 7A:
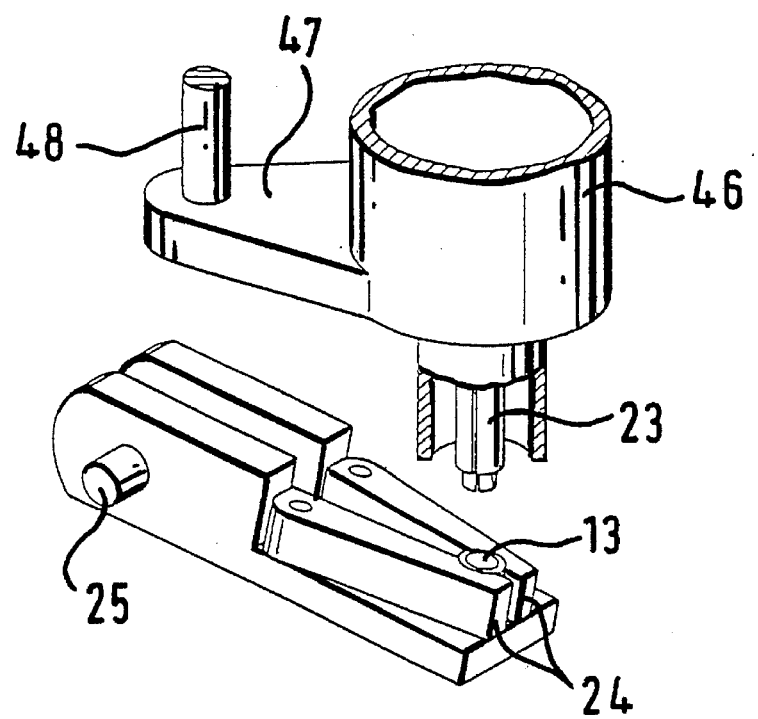
FIGS. 7a and 7b show the pair of tongs for receiving the weld-in part in the lowered and raised position.
Figure 7B:
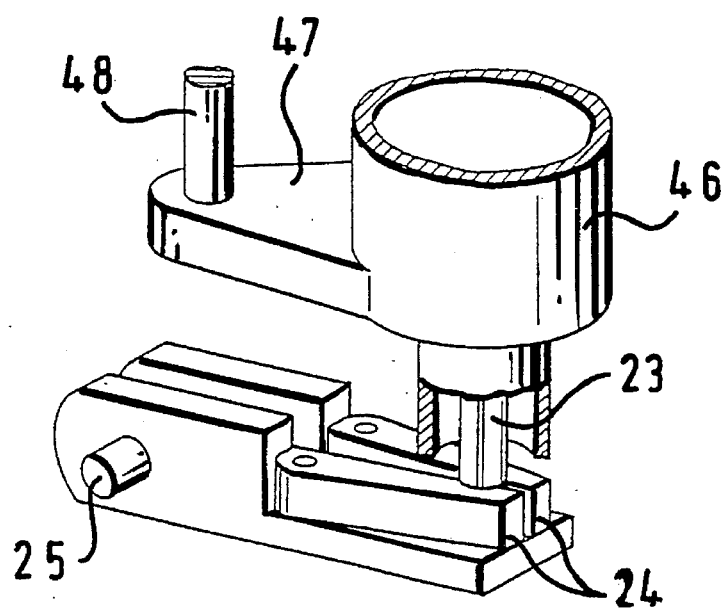

In this starting position, the welding head (11) is located with its collet chuck (23) above a pair of tongs (24) of which the mode of operation is described in detail in conjunction with FIGS. 7a and 7b. The pair of tongs (24) keeps a new weld-in part ready between its jaws (see FIG. 7a). The tongs (24) are then pivoted in the manner of a rocker round the shaft (25) shown in FIGS. 7a and 7b so the weld-in part secured by the tongs is pressed onto the collet chuck (23). The collet chuck (23) then takes the weld-in part (13), for which purpose the tongs (24) are opened and pivoted back into the position shown in FIG. 1.

This transfer of a weld-in part (13) to the collet chuck (23) of the welding head (11) takes place during the operating phase in which the drill (12) drills the recess (22) in the above-described manner. After the drilling process, a welding head (11) equipped with a new weld-in part (13) is immediately available for the subsequent welding process.

Figure 4B:
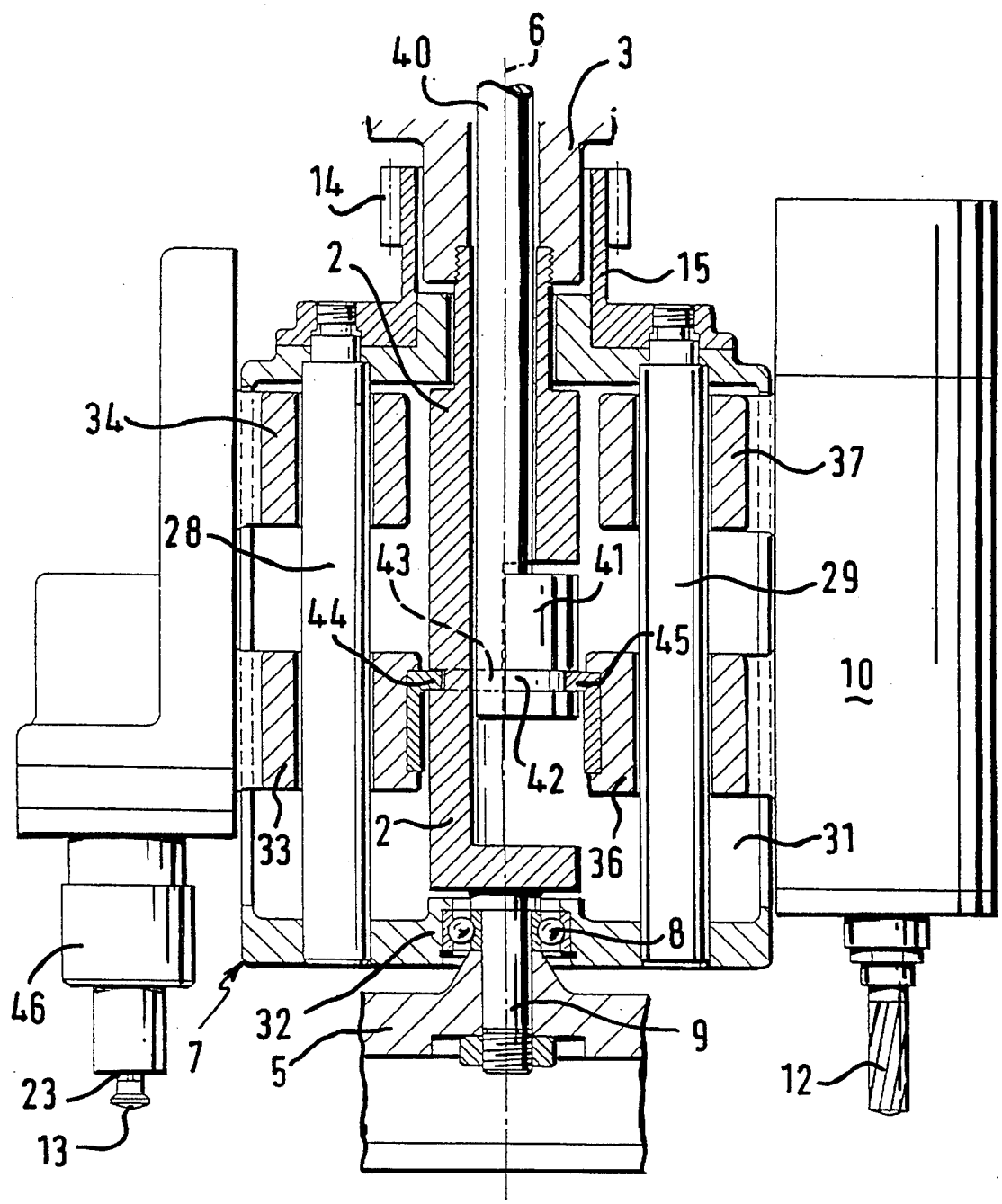
Figure 5A:
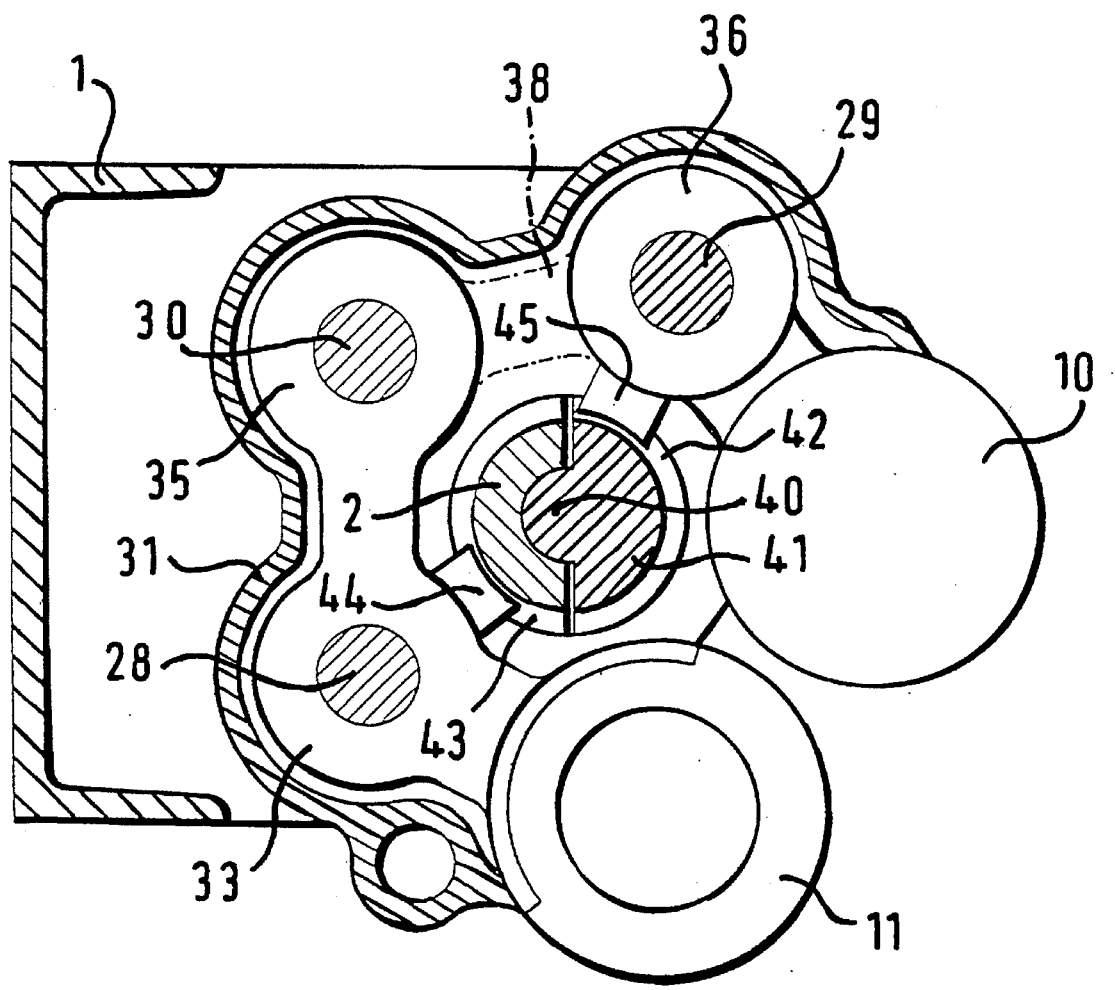

The mechanism for the axial displacement of the drill drive (10) and the welding head (11) is now described in detail with reference to FIGS. 4a and 4b and 5a and 6a, 6b, 6c:

Omitting the frame (1), FIG. 4a shows the revolving device (7) of which only the upper part (26) and 5 the lower part (27) are illustrated. These two parts (26, 27) are rigidly connected to one another via the axial guides (28, 29). There is also the axial guide (30) which is shown only in FIGS. 5a and 5b. The axial guides (28, 29 and 30) are screwed, for example, to the upper part (26) and lower part (27) of the revolving device. FIG. 5a also shows the rear wall (31) of the revolving device which is omitted from FIG. 4a for the sake of clarity. The rear wall (31) of the revolving device is also shown in FIG. 4b. In the region of its upper part (26), the revolving device (7) with its hub (15) comprises the revolving device shaft (2) which extends downwardly through the entire revolving device (7) and through the lower part (27) where it is surrounded below the lower part (27) by the ball bearing (8) which is shown in FIG. 4b and rests outwardly against the hub (32) of the revolving device (7) rigidly connected to the lower part (27) of the revolving device. The three axial guides (28, 29, 30) form the bearing required for the lifting movements of the drill drive (10) and welding head (11) together with the guide sleeves (33, 34 and 35) as well as (36, 37 and 39) (see FIG. 5b). These guide sleeves (33, 34, 35) are fastened on the welding head (11) so that the welding head (11) is reliably guided axially via the above-mentioned three guide sleeves and the two axial guides (28, 30). The drill drive (10) is accordingly mounted on the axial guides (29, 30) by means of two guide sleeves (36, 37, 39). The last guide sleeve 38, not shown in FIG. 4a, is located below the guide sleeve (35) (see FIG. 5b) and is attached to the web (38) issuing from the guide sleeve (36).

Figure 5B:
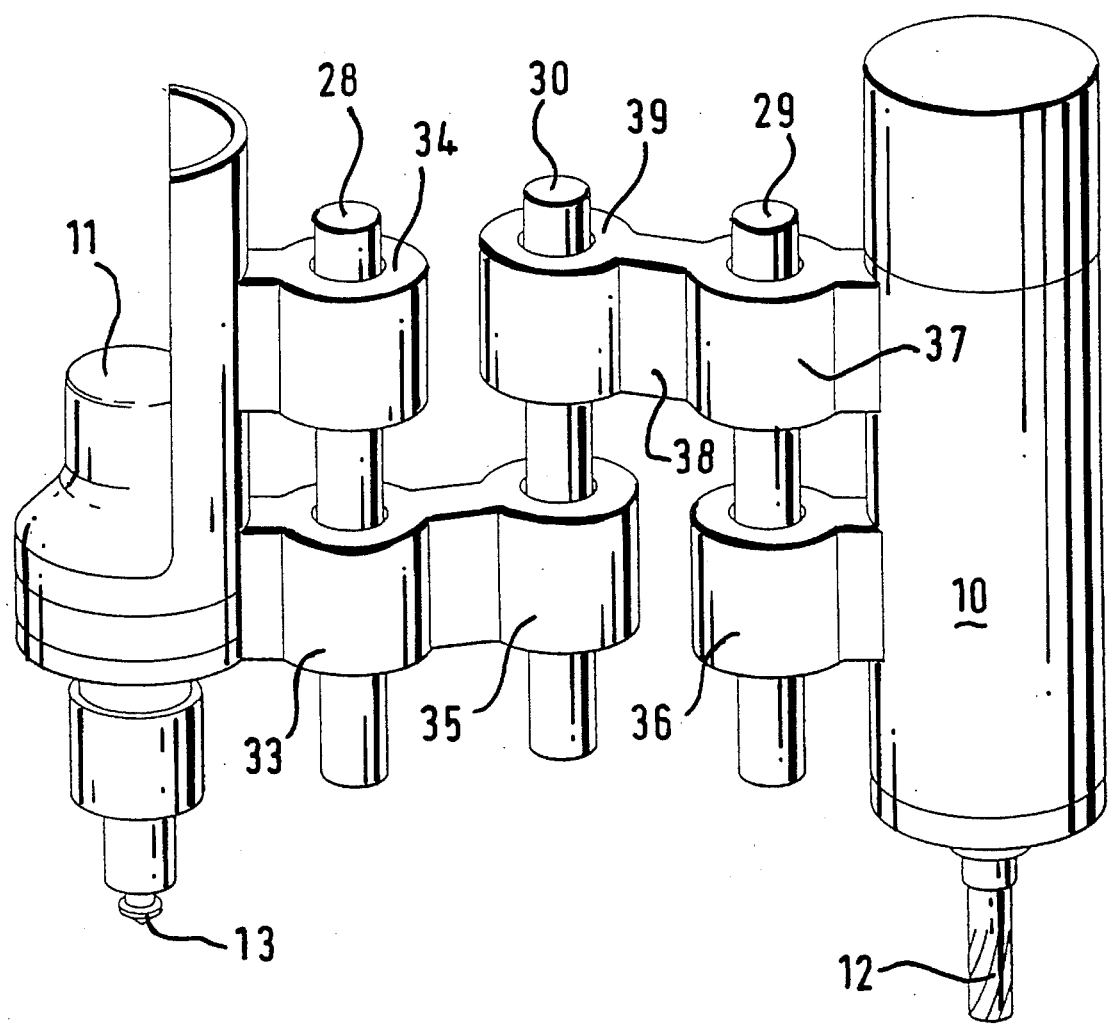
FIG. 5b shows a basic illustration of the axial guides and the guide sleeves for the drill drive and the welding head.

The above-described allocation of the guide sleeves (33, 34, 35 and 36, 37, 39) and of the axial guides (28, 29, 30) is shown in detail in FIG. 5b. Owing to the mutual offset of the guide sleeves (35, 39), the guide sleeves cannot obstruct one another during the respective reciprocating movements of the drill drive (10) or of the welding head (11).

The development of the illustration according to FIG. 4a shown in FIG. 4b, in which the axial guide (28, 29) and the revolving device shaft (2) are shown in one plane, shows the rigid installation of the revolving device shaft (2) in the cross member (3) and the housing foot (5) as well as the pivotal mounting of the revolving device (7) being secured axially relative to the revolving device shaft (2) by the mounting of the revolving device (7) via the ball bearing (8) on the revolving device shaft (2).

Figure 6A:
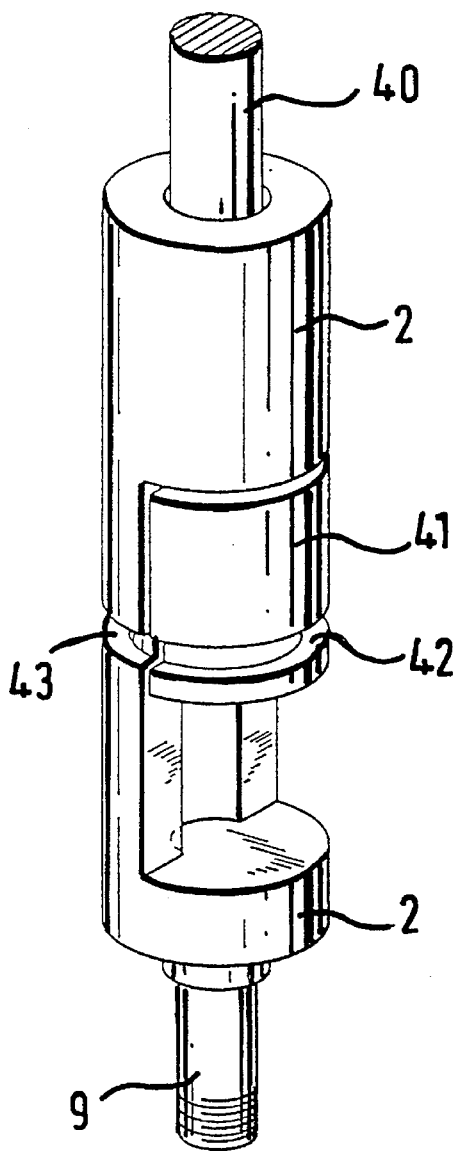
FIGS. 6a and 6b show the revolving device shaft with clutch shaft and a displaceable clutch piece, more specifically FIG. 6a with clutch piece located in the return position and FIG. 6b with clutch piece located in the machining end-position.
Figure 6B:
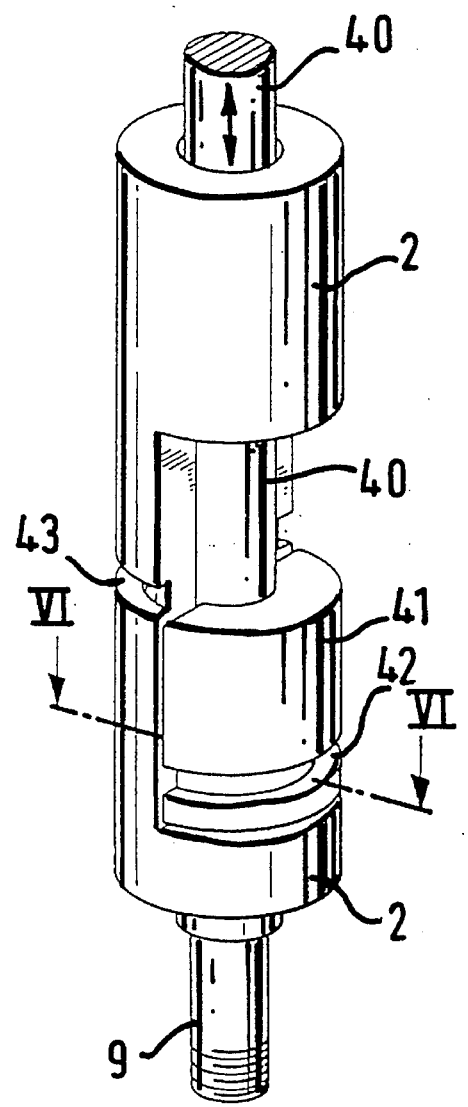
Figure 6C:
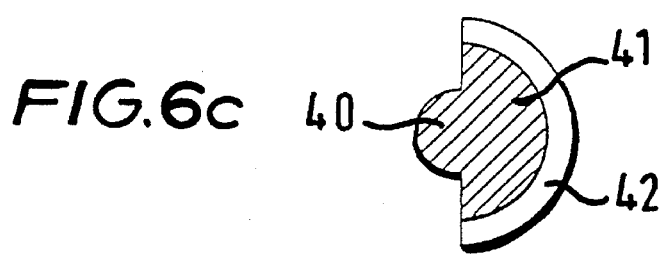
FIG. 6c is a section along line VI—VI in FIG. 4b showing only the clutch piece.

The lifting mechanism for raising and lowering the drill drive (10) and the welding head (11) is described hereinafter:

Raising and lowering are effected by the lifting motor (4) which is an advance unit programmed for linear displacement. It is possible to use, for example, a step-by-step motor which acts via a nut member on an axially displaceable spindle. A so-called screw reluctance motor of the type described, for example, in DE-OS 41 20 811 may also be used. The lifting motor (4) is rigidly connected to the clutch shaft (40) extending coaxially in the revolving device shaft (2). During adjustment of the lifting motor (4), the clutch shaft (40) is axially displaced relative to the frame (1) and therefore also relative to the revolving device (7) without rotating. As shown in FIG. 4b, the clutch member (41) is attached readily to the clutch shaft (40) and is therefore displaced accordingly during the axial displacement of the clutch shaft (40). The clutch member (41) can adopt the end positions shown in FIGS. 6a and 6b, FIG. 6a showing the return position and FIG. 6b the machining end-position. The clutch member (41) has, in its lower region, the peripheral groove (42) which is flush with the groove (43) in the revolving device shaft (2) when the clutch member (41) is located in its return position (FIG. 6a). In this position there is therefore formed an annular groove which surrounds both the clutch member (41) and the respective part of the revolving device shaft (2). The revolving device shaft (2) is halved in the reciprocating region of the clutch member (41), the missing half being made up by the clutch member (41). To illustrate this, FIG. 6c shows the clutch member (41) alone in a section along line VI—VI from FIG. 6b. In the lowered position of the clutch member (41) shown in FIG. 6b (machining end-position), the groove (42) therefore extends only over half an arc round the clutch shaft (2).

The grooves (42) and (43) serve to transfer the reciprocating movement of the clutch member (41) via driving projections (44, 45) shown in FIGS. 4a and 4b onto the welding head (11) and the drill drive (10). For this purpose, the driving projection (44) is fastened on the guide sleeve (33) to which the welding head (11) is attached so that an axial movement of the driving projection (44) leads to a corresponding axial movement of the welding head (11). The driving projection (45) is consequently fastened on the guide sleeve (36) to which the drill drive (10) is attached so that an axial displacement of the driving projection (45) leads to a corresponding axial displacement of the drill drive (10).

When the clutch part (41) is located in its return position (see FIG. 6a), the driving projections (44, 45) can slide along in the groove (42/43) during pivoting of the revolving device (7) without affecting the height of the drill drive (10) or of the welding head (11). In this return position, therefore, the revolving device may be pivoted to and fro as desired. In the operating phase shown in FIG. 1 in which the drill (12) is ready for the drilling process, the driving projection (44) allocated to the welding head (11) is located in the region of the groove (43) whereas the driving projection (45) allocated to the drill drive (10) is located in the region of groove (42). During a lowering of the clutch shaft (40) and corresponding lowering of the clutch part (41), the drill drive (10) is lowered via the driving projection (45) while the welding head (11) is secured in its return position via the driving projection (44). Owing to the lowering of the drill (12) controlled by the lifting motor, the drilling process described in conjunction with FIG. 1 is carried out until the clutch part (41) and therefore the drill drive (10) have reached the machining end-position which is shown with respect to the clutch part (41) in FIG. 6b. The clutch shaft (40) is then returned into the return position so that the drill drive (10) is conveyed back into the return position via the clutch part (41) and the driving projection (45) allocated to the drill drive (10) is displaced into the groove (43). The welding head (11) is now therefore moved downwardly during lowering of the clutch part (41) via the driving projection (44) while the drill drive (10) is secured in its return position via the driving projection (45) and the groove (43).

Owing to the division of the groove (42/43) into two regions, of which one (42) may be axially lowered and raised by means of the clutch part (41), either the welding head (11) is held in its return position at each pivoting position of the revolving device (7) while the drill drive (10) is lowered or, conversely, the drill drive (10) is secured in its return position and the welding head (11) is lowered by means of the clutch part (41).

In the return position, either the drill drive (10) or the welding head (11) adopts a rest position, the respective driving projection (44 or 45) being set aside, so to speak, on a rest shoulder formed by the lower side of the groove (43).

FIGS. 7a and 7b which have already been described in conjunction with the explanation of the tongs (24) again show the mouthpiece (46) which may be displaced axially along the collet chuck (23) by means of the arm (47) and the lifting mechanism (48) (not shown in detail). In the loading position shown in FIG. 7b in which a weld-in part (13) is taken by collet chuck (23), the sleeve (46) is shown in a raised position. The sleeve (46) serves to channel a stream of protective gas issuing from the welding head (11) and to supply it to the weld point. For this purpose, the mouthpiece (46) is displaced axially downwardly into a lowered position shown in dot dash lines in FIG. 2 before the weld-in part (13) has reached its end position. The mouthpiece (46) is then returned to the upper end position shown in FIG. 2 in which it remains, particularly during the equipping procedure according to FIGS. 7a and 7b. It is again pointed out that the mouthpiece (46) in its lowered position shown in dot dash lines in FIG. 2 also serves to collect welding spatter.

Figure 8A:
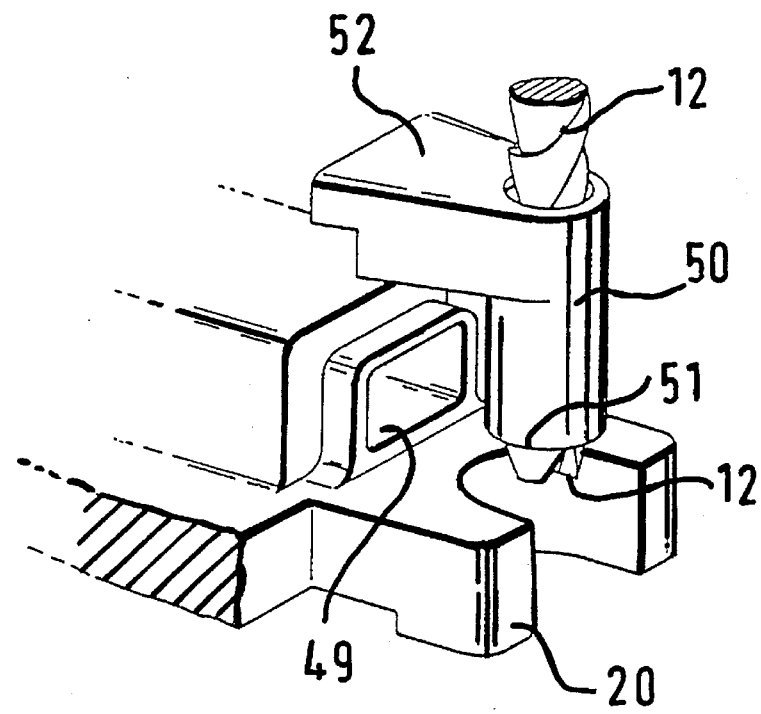
FIGS. 8a and 8b show the drill with raised and 5 lowered suction arrangement.
Figure 8B:
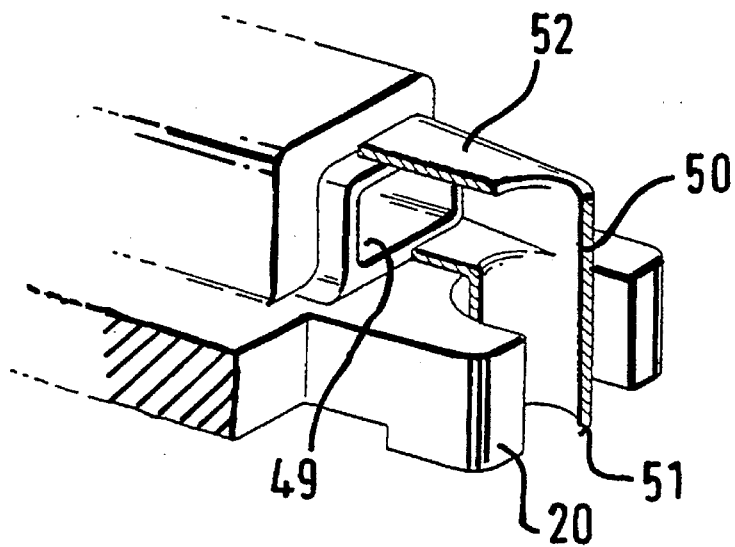

FIGS. 8a and 8b show an arrangement also shown in FIG. 1 which serves to aspirate cuttings produced during drilling. The suction channel (49) which opens into the frame (1) and leads to an exhaust fan is provided for this purpose. The drill drive (10) is allocated the suction nozzle (50) (shown in section in FIG. 8b) which surrounds the drill (12) and is lowered during the drilling process with the drill drive (10) until its lower edge (51) is at a short distance from the metal covering (18). The suction nozzle (50) then leads via the duct (52) connected to it into the suction channel (49), producing an air stream which runs from the exterior through the gap between the metal covering (18) and the lower edge (51) then flows through the suction nozzle (50) and the duct (52) and finally enters the suction channel (49). This suction arrangement also causes flue gases surrounding the weld point to be aspirated via the suction channel (49) after the welding process.

FIG. 1 also shows a basic electric circuit which serves on the one hand to control the lifting motor (4) and on the other hand to produce a signal when the drill (12) strikes the metal covering (18). For this purpose there is inserted in the circuit (60) supplying the drill drive (10) the ammeter (61) which displays an increase in current when the drill (12) strikes the metal covering (8), the increase in current being caused by the loading of the drill (12). The ammeter (61) may be provided with a known threshold switch for this purpose. The signal emitted by the ammeter (61) is conveyed via the line (62) of an electric controller which may be of known construction and of which the internal design is irrelevant in this connection. The electric controller (63) controls, via the control line (64), the lifting motor (4) which, for this purpose, receives, from the electric controller (63) the necessary control signals for lowering and raising the clutch shaft (40). With these signals, the lifting motor (4) is adjusted in each case to the necessary direction of advance, speed of advance and stroke length. When a digitally controlled step-by-step motor is used as a lifting motor (4), corresponding pulses and an associated direction sign are therefore transmitted via the control line (64) to the lifting motor (4).

We claim:

1. A process for joining a plurality of stacked metal bodies at a plurality of weld points comprising the steps of
   providing a welding machine including a drilling tool and a welding head;
   sequentially operating said machine through a predetermined time cycle to successively:
   drill said stacked bodies at a selected weld point to expose a fresh metal surface on each body;
   initiate a welding arc at said selected weld point within a predetermined time after completion of said drilling step to prevent formation of more than a preselected depth of contaminant on said fresh metal surfaces, the operating parameters of said arc being preset to complete a weld joining said bodies even in the presence of said preselected depth of contaminant;
   extinguish said arc; and
   repeat said drilling, initiating and extinguishing steps at each of said plurality of weld points.

2. A process as claimed in claim 1 wherein said metal bodies are aluminum and said contaminant is aluminum oxide.

3. A process as claimed in claim 1 and including
   providing a plug of compatible metal; and
   presenting said plug at said weld point as said welding arc is initiated so that said plug becomes part of said weld.

4. A process as claimed in claim 1 and including the step of applying a suction device to said weld point prior to said initiating step to remove debris caused by said drilling step.

5. A process as claimed in claim 1 and including the step of flooding said weld point with a protective gas during and between said drilling and initiating steps.

6. A process for joining a pair of overlapping aluminum sheets at a plurality of weld points comprising the steps of
   providing a welding machine including a cutting tool and a welding head;
   sequentially operating said machine through a predetermined time cycle to successively:
   cut said sheets at a selected weld point to expose a fresh aluminum surface on each body;
   initiate a welding arc at said selected weld point within a predetermined time after completion of said cutting step to prevent formation of more than a preselected depth of aluminum oxide on said fresh aluminum surfaces, the operating parameters of said arc being preset to complete a weld joining said sheets even in the presence of said preselected depth of aluminum oxide;
   extinguish said arc; and
   repeat said cutting, initiating, and extinguishing steps at each of said plurality of weld points.

7. A process as claimed in claim 6 and including the step of removing debris from said weld point before initiating said arc.

8. A process as claimed in claim 6 and including the step of flooding said weld point with an inert gas during and between said drilling and initiating steps.

9. A process for joining a pair of stacked aluminum bodies at a plurality of weld points comprising the steps of
   providing a welding machine including a drilling tool and a welding head;
   providing an aluminum plug in said welding head;
   sequentially cycling said machine over a predetermined time cycle to successively:
   drill said bodies at a selected weld point to expose a fresh aluminum surface on each body;

present said plug to said weld point;

initiate a welding arc at said selected weld point within a predetermined time after completion of said drilling step to prevent formation of more than a preselected depth of contaminant on said fresh metal surfaces;

extinguish said arc; and repeat said drilling, presenting, initiating and extinguishing steps at each of said plurality of weld points.

10. A process as claimed in claim 9 wherein the time cycle of said machine is substantially constant;

the time of exposure of fresh aluminum to oxygen is substantially constant;

the depth of said contaminant is substantially constant; and the voltage, current, gap and duration of said welding arc are established at levels to complete the joinder by welding of said bodies and said plug.

11. A process as claimed in claim 10 wherein said time of exposure is approximately 0.1 sec. and wherein the depth of contaminant is less than one micron.

12. A process for joining a pair of aluminum bodies at a plurality of weld points comprising the steps of providing a pair of aluminum bodies in overlapped relationship;

providing a welding machine including a drilling tool and a welding head;

providing an aluminum plug in said welding head;

sequentially cycling said machine to successively:

drill said bodies at a selected weld point within the overlapped region;

present said plug to said weld point;

initiate a welding arc at said selected weld point;

extinguish said arc; and repeat said drilling, presenting, initiating and extinguishing steps at each of said plurality of weld points.

13. A machine for preparing and welding a weld point in two overlapping metal bodies comprising a rotary device rotatable between a first and a second operating position;

a drill coupled to said rotary device and operable in said first operating position to drill said bodies at said weld point to expose fresh metal surfaces on both of said bodies; and a welding head coupled to said rotary device and operable in said second operating position to weld said bodies at said weld point, said welding head including a gripping device for conveying a weld-in part to said weld point; and means for delivering said weld-in part to said gripping device while said rotary device is in said first operating position.

14. A machine as claimed in claim 13 and including a lifting motor for lowering said drill into said bodies indicator means for indicating entry of said drill into a first one of said bodies;

control means for controlling movement of said welding head based on the position of said bodies as indicated by said indicator means.

15. A machine as claimed in claim 13 wherein said drill and said head are arranged on a revolving device which is rotatable round a revolving device shaft and displaceably by a common lifting motor in the direction of the revolving device shaft, each of said drill and said head being mounted in a singly longitudinally displaceable manner individually on axial guides rigidly connected to the revolving device, the revolving device shaft being fastened on a frame carrying the lifting motor and, as a hollow shaft, surrounding a coaxial clutch shaft which is axially displaceable by the lifting motor and on which said drill and said head may be coupled and uncoupled singly and independently of one another.

16. A machine according to claim 15, wherein said drill rests in a drill drive arranged as a unit with the drill longitudinally displaceably in the revolving device.

17. A machine according to claim 15, wherein there is connected to the revolving device, a toothed quadrant which is arranged coaxially to the clutch shaft and in which a tooted rack driven by a displacement mechanism engages for performance of the pivoting movement of the revolving device.

18. A machine according to claim 15, wherein, in the rest position of the welding head, a pair of tongs which is pivotal in the manner of a rocker for receiving a weld-in part faces the welding head, wherein the weld-in parts may be supplied to the pair of tongs singly in succession, one respective weld-in part being inserted into a receiver in the welding head by pivoting of the pair of tongs.

19. A machine according to claim 18 for processing weld-in parts with a hole, wherein the receiver has an expanding pin which grasps and clamps the weld-in part in its hole.

20. A machine according to claim 15, wherein a clamping device is provided on the frame with which components to be welded are gripped.

21. A machine according to claim 20 wherein the clamping device consists of a frame foot which is arranged on the frame and implements the gripping of the components against an abutment of the clamping device when the device is started up.

22. A machine according to claim 15, wherein a suction arrangement surrounding the drill is connected to the drill drive.

23. A machine according to claim 22, wherein the suction arrangement is arranged axially displaceably.

24. A machine according to claim 15, wherein a separately lowerable mouthpiece, surrounding the weld point, for supplying protective gas is arranged on the welding head.

25. A machine according to claim 24, wherein the mouthpiece is arranged axially displaceably.

26. A machine according to one of claim 15, wherein an ammeter is inserted into a circuit for the drill drive, the ammeter emitting a signal of which the appearance determines the relative position of the clutch shaft, when the loan on the drill drive is increased due to the drill striking the surface of the metal covering.

27. A machine according to claim 26, wherein the depth of drilling is defined on the basis of the relative position.

28. A machine according to claim 26, wherein an approach position of the weld-in part onto the metal plate is defined by the relative position.

* * * * *